(12) United States Patent
Quinn et al.

(10) Patent No.: US 8,694,177 B2
(45) Date of Patent: Apr. 8, 2014

(54) FLEXIBLE VEHICLE DISPLAY

(75) Inventors: Michael J. Quinn, Troy, MI (US); Anthony G. Lobaza, Bloomfield Hills, MI (US); Richard C. Vanitvelt, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 13/026,916

(22) Filed: Feb. 14, 2011

(65) Prior Publication Data

US 2011/0224842 A1 Sep. 15, 2011

Related U.S. Application Data

(60) Provisional application No. 61/313,541, filed on Mar. 12, 2010.

(51) Int. Cl.
*G05D 1/00* (2006.01)
(52) U.S. Cl.
USPC ............................................. 701/2; 709/218
(58) Field of Classification Search
USPC ................ 701/2; 709/218, 232; 715/210, 700
See application file for complete search history.

(56) References Cited

U.S. PATENT DOCUMENTS

| | | | |
|---|---|---|---|
| 6,139,177 A | 10/2000 | Venkatraman et al. | |
| 2009/0226001 A1* | 9/2009 | Grigsby et al. | 381/77 |
| 2010/0097239 A1* | 4/2010 | Campbell et al. | 340/825.25 |

OTHER PUBLICATIONS

Mi-Joung Choi et. al.: An efficient embedded Web server for Web-based network element management. In: IEEE/IFIP Network Operations and Management Symposium, Apr. 2000, NOMS 2000, S. 187-200.

\* cited by examiner

*Primary Examiner* — Thomas Black
*Assistant Examiner* — Luke Huynh

(57) ABSTRACT

A method and system for displaying graphical content on a vehicle display includes a client module and a plurality of control modules. The client module is in communication with the vehicle display and the plurality of control modules. Each of the plurality of control modules include software for generating a graphical text data intended to be shown on the vehicle display. The graphical text data is formatted with a predetermined layout determined by the corresponding one of the plurality of control modules. The client module includes a control logic for showing the graphical generated by the at least one of the plurality of control modules on the vehicle display. The graphical text data shown on the vehicle display is formatted with the predetermined layout determined by the corresponding one of the plurality of control modules.

20 Claims, 2 Drawing Sheets

FLEXIBLE VEHICLE DISPLAY

CROSS-REFERENCE TO RELATED APPLICATIONS

Figure 1:
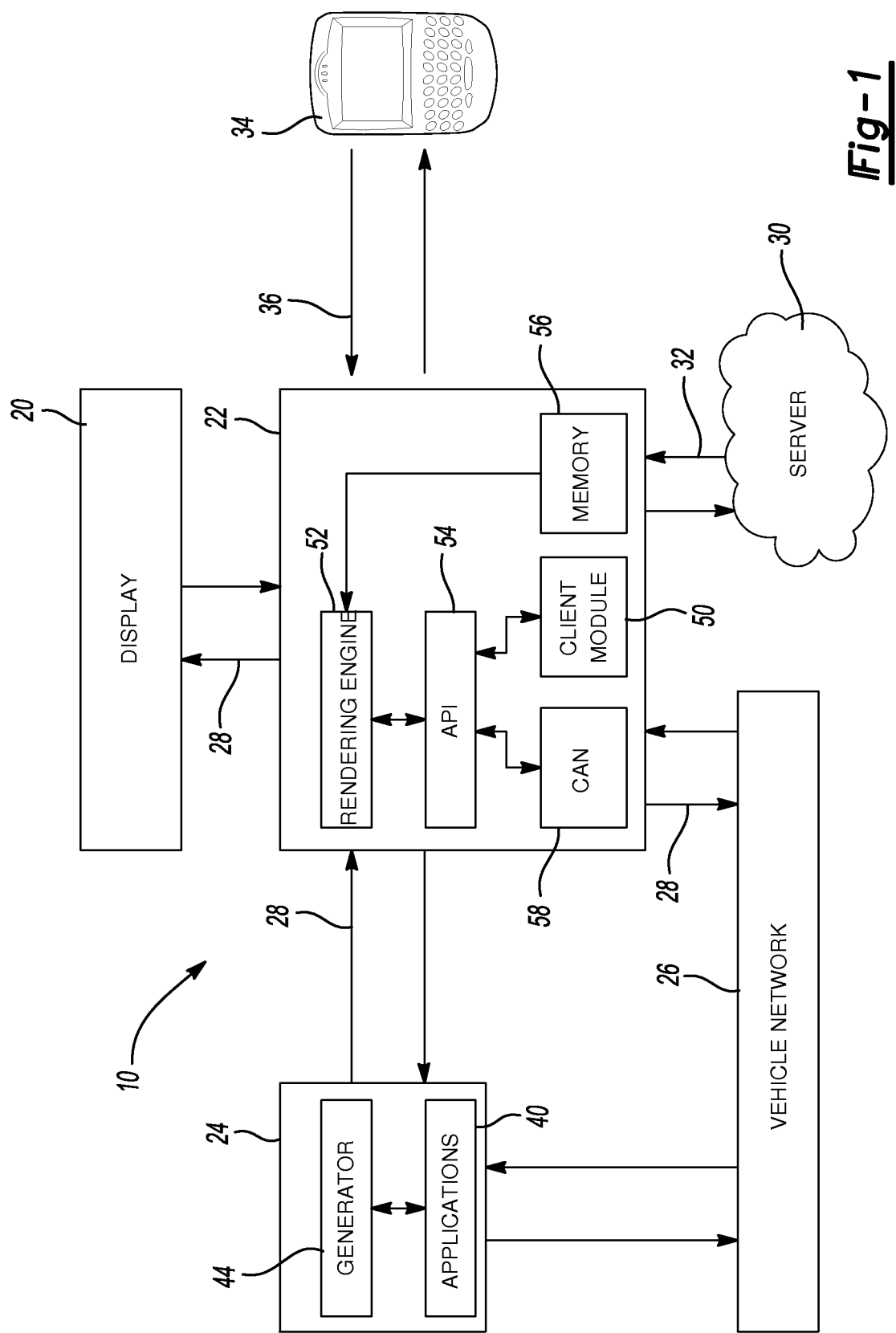

This application claims the benefit of U.S. Provisional Application No. 61/313,541, filed on Mar. 12, 2010. The disclosure of the above application is incorporated herein by reference.

FIELD

The present disclosure relates to a system and method of communicating data to a display monitor, and more particularly to a system and method of communicating data from several control modules to the display module.

BACKGROUND

The statements in this section merely provide background information related to the present disclosure and may or may not constitute prior art.

Display monitors are commonly used in passenger vehicles and can be used in a variety of ways such as, for example, a computer display, a navigation display, or as a television. Display monitors can also be used to show data generated from a remote device that is in communication with the local vehicle network. For example, a handheld device, such as a mobile telephone, can share data with the local vehicle network through a Bluetooth connection.

The display monitor is able to display information through the use of predefined templates that are stored in the memory of a control module associated with the display monitor. Each template has a similar format and typically uses the same character font, layout and style. Therefore, the display monitor is usually only able to display information that is in the format defined by the templates.

While display monitors achieve their intended purpose, there is a need for a new and improved display monitor which exhibits improved performance from the standpoint of supporting application specific interfaces.

SUMMARY

The present invention provides a method and system for displaying graphical content on a vehicle display. The system includes a client module and a plurality of control modules. The vehicle display is connected to the vehicle. Each of the plurality of control modules include software for generating a graphical text data intended to be shown on the vehicle display. The graphical text data is formatted with a predetermined layout determined by the corresponding one of the plurality of control modules. The graphical text data includes a set of data signals that define at least one of a text layout, character font, size and color that is displayed on the vehicle display. The client module is connected to the vehicle. The client module is in communication with the vehicle display and the plurality of control modules. The client module includes a first control logic for monitoring the plurality of control modules for the set of data signals. The client module further includes a second control logic for receiving the set of data signals. The client module further includes a third control logic for showing the graphical text data generated by the at least one of the plurality of control modules on the vehicle display. The graphical text data shown on the vehicle display is formatted with the predetermined layout determined by the corresponding one of the plurality of control modules.

In still another embodiment of the present invention, the set of data signals are in scripting language format, markup language format, and style sheet language format.

In yet another embodiment of the present invention, the client module includes a rendering engine and a combined layered application programming interface and scripting engine (API and scripting engine). The rendering engine receives the data signals in markup language format and style sheet language format. The API and scripting engine interacts with the data signals in scripting language format.

In still another embodiment of the present invention, the data signals in scripting language format are in JAVASCRIPT, the data signals markup language format are in hypertext markup language (HTML), and the data signals in the style sheet language format as in cascading style sheet (CSS) format.

In yet another embodiment of the present invention, the client module executes markup language and scripting language based code.

In still another embodiment of the present invention, the client module includes a memory. The memory stores localized markup language files.

In yet another embodiment of the present invention, the vehicle display includes selectable controls that receive user input. The vehicle display generates user input data signals that are indicative of user input. The user input data signals are communicated to the client module.

In still another embodiment of the present invention, the client module includes a fourth control logic for monitoring the vehicle display for the user input data signals.

In yet another embodiment of the present invention, the client module includes a fifth control logic for interacting with the user input data signals. The client module communicates control messages and data requests indicative of the user input data signals to at least one of the plurality of control modules.

In still another embodiment of the present invention, one of the plurality of control modules is a vehicle control module, and another one of the plurality of control modules is a remote electronic device.

In yet another embodiment of the present invention, the vehicle control module is one of a telematics module, an engine control module, and a transmission control module. The remote electronic device is one of a smartphone, a laptop computer, and a personal digital assistant (PDA).

In still another embodiment of the present invention, the client module and at least one of the plurality of control modules are in communication with a vehicle network. The vehicle network sends data signals indicating diagnostic information generated by a vehicle system.

In yet another embodiment of the present invention, a Media Oriented Systems Transport (MOST) network connection is used between the client module and at least one of the plurality of control modules and the vehicle network.

In still another embodiment of the present invention, the client module is in communication with an off-board server. The off-board server provides an Internet connection, and wherein the off-board server generates a second set of graphical text data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
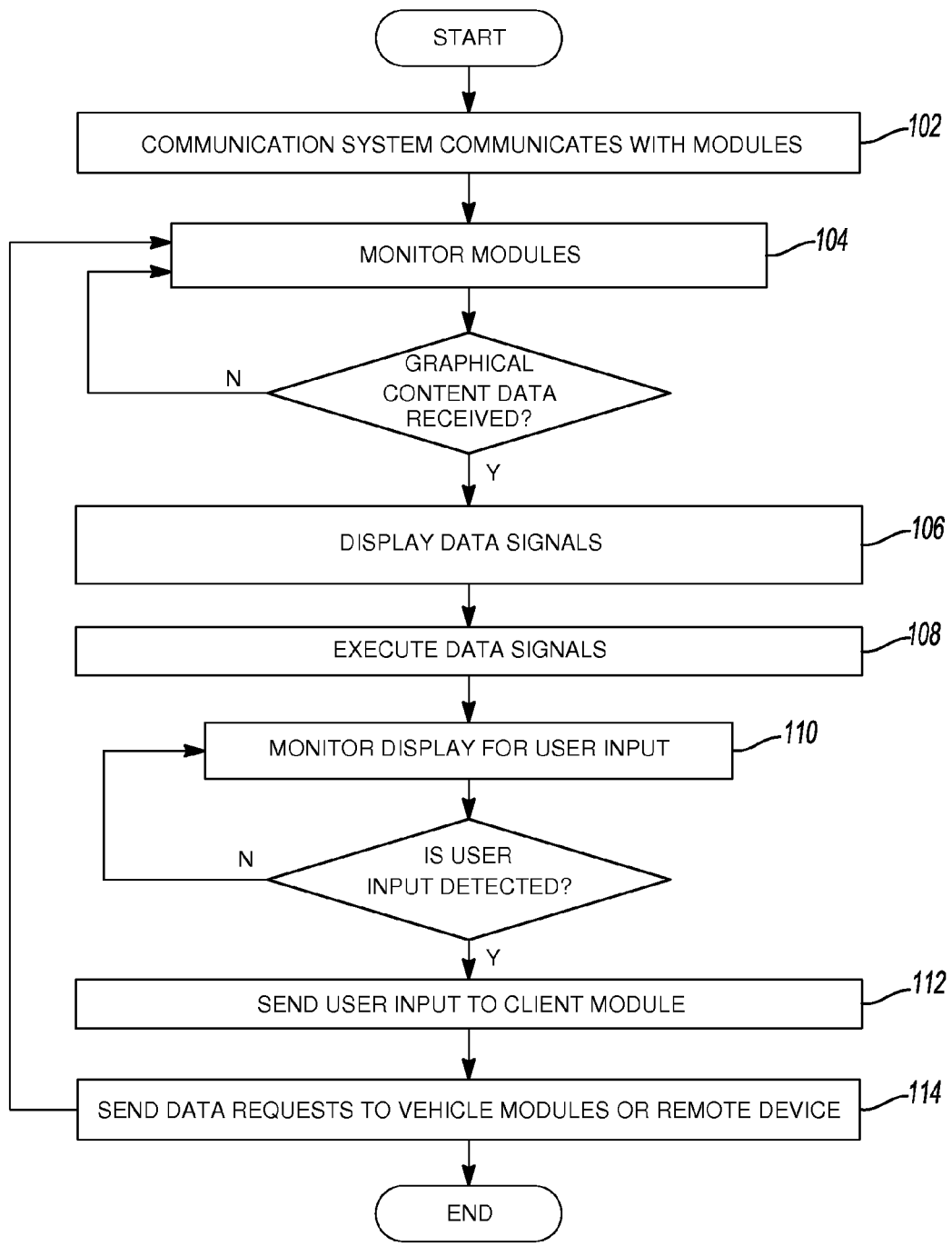

FIG. 1 is a block diagram of an exemplary communication data system including a display monitor, a client module, a vehicle module, a remote module, and an off-board server; and FIG. 2 is a flow diagram illustrating a process for communicating data through the client module to the display monitor.

DETAILED DESCRIPTION

The following description is merely exemplary in nature and is not intended to limit the present disclosure, application, or uses.

With reference to FIG. 1, an exemplary communication data system 10 is illustrated as a block diagram, and includes a display monitor 20, a client module 22, a vehicle module 24, and a vehicle network 26. In the embodiment as shown, the data communication system 10 is used in a vehicle electronics system, however those skilled in the art will appreciate that the communication data system 10 may be used in other applications as well. The client module 22 is in communication with each of the display module 20, the vehicle module 24, and the vehicle network 26 by a plurality of data links 28. The data links 28 may be any type of bidirectional communication interface, such as, for example, a wireless network or data communication lines. In one embodiment, some or all of the data links 28 are part of a Media Oriented Systems Transport (MOST) network.

The client module 22 is also in communication with at least one remote device that is not part of the vehicle electronic system. In the embodiment as shown, the client module 22 is in communication with an off-board server 30 by a data link 32 and a remote electronic device 34 by a data link 36. The data links 32 and 36 are also any type of bidirectional communication interface. For example, the data link 32 between the client module 22 and the off-board server 30 is either through a Network Access Device embedded in the vehicle or by a Bluetooth phone data connection. The data link 36 between the client module 22 and the electronic device 34 can be either a Bluetooth signal or a universal serial bus (USB) connection.

The vehicle network 26 is any type of vehicle network for communicating information regarding one of more vehicle systems. In the embodiment as illustrated, the vehicle network 26 is a controller area network (CAN) that is a vehicle bus designed to allow different control modules to communicate with each other in a vehicle. The network 26 is in communication with both of the client module 22 and the vehicle module 24 through the data links 28. In one embodiment, the vehicle network 26 sends data signals indicating diagnostic information generated by one of the vehicle systems to the client module 22 and the vehicle module 24.

The vehicle module 24 regulates operation of one of the vehicle systems, and is preferably an electronic control device having a preprogrammed digital computer or processor, control logic, memory used to store data, and at least one I/O peripheral. The control logic includes a plurality of logic routines for monitoring, manipulating, and generating data. The vehicle module 24 can be any type of electronic control module such as, for example, an engine control module, a telematics control module, or a transmission control module. It should be noted that while FIG. 1 illustrates only one module for regulating a vehicle system, it is understood that any number of control modules that are used to regulate a vehicle system may be used as well.

The vehicle module 24 has software 40 including an application logic that is responsible for performing the data processing required of the vehicle module 24. When the software environment 40 generates graphical content that is intended for display on the display module 20, the vehicle module 24 transmits the graphical content over the data links 28 and to the client module 22 in a particular format. Specifically, the software 40 generates several types of data signals that are in a scripting language format, a markup language format, and a style sheet language format.

The scripting language format data can be any type of scripting language such as, for example, JAVASCRIPT. It may be preferable to use JAVASCRIPT in some types of applications in an effort to reduce development time, as JAVASCRIPT is an industry standard language, however those skilled in the art will appreciate that other types of scripting languages can be used as well. The markup language format data can be any type of markup language that is used to structure and index the text that is to be displayed on the display monitor 20 such as, for example, extensible markup language (XML) or hypertext markup language (HTML). However, it may be preferable to use HTML in some types of applications in an effort to reduce development time, as HTML is an industry standard language. The software environment 40 also includes a markup generator 44 that is used to generate the markup language that is needed to structure and index the text that is to be displayed on the display monitor 20. The style sheet format data can be any type of style sheet language that is used to describe the presentation of the text that is to be displayed on the display monitor 20. For example, the style sheet language can describe font type, size, and color. In one embodiment, cascading style sheet (CSS) language is used, however those skilled in the art will appreciate that other types of style sheet languages may be used as well.

The client module 22 receives the graphical content data including data signals that are in the scripting language format, the markup language format, and a style sheet language format from the vehicle module 24. The client module 22 is used to send and receive data from the display monitor 20, and is preferably an electronic control device having a preprogrammed digital computer or processor, control logic, memory used to store data, and at least one I/O peripheral. The control logic includes a plurality of logic routines for monitoring, manipulating, and generating data. The client module includes client module software 50, a layout or rendering engine 52, a layered application programming interface (API) and scripting language engine 54, a memory 56 for storing files, and a CAN interface 58.

The rendering engine 52 is used to receive the data signals in the markup language and the style sheet language format and displays the data signals on the display monitor 20 as a graphical user interface (GUI). The rendering engine 52 receives data signals from the vehicle module 24 as well as the memory 56 of the client module 22, where the memory 56 includes localized markup language files. For example, in one embodiment the memory 56 includes several HTML files. The API and scripting engine 54 is used to access data signals as well as provide an interface between the display monitor 20 and the vehicle module 24. Specifically, the API and scripting engine 54 is used to interact with the data signal indicative of the scripting language from the vehicle module 24. The API and scripting engine 54 is also used to read the data signal indicative of the scripting language, and then execute the scripting language accordingly. In one embodiment, the client module 22 includes memory that stores scripting data, and the API and scripting engine 54 is used to interact and execute the scripting data that is stored in the memory of the client module 22.

The client module 22 is also used to receive user input from the display module 20, and send the commands or data requests over the data links 28 to the vehicle module 24 and the vehicle network 26. The display monitor 20 is a screen such as, for example, a liquid crystal display (LCD) that electronically displays graphics like text, images, and moving pictures. In one embodiment, the display monitor 20 is located in an area of a vehicle that can be viewed by a driver such as, for example, in the center console located within an interior of a vehicle. The display monitor 20 may also include selectable controls (not shown) that a user can manipulate to generate a user input. The user input is communicated to the client module 22 through the data link 28. The API and scripting engine 54 interacts with the user input from the display monitor 20, and sends control messages and data requests indicative of the user input to the vehicle module 24 and the vehicle network 26 through the data links 28. For example, if the display module 20 shows a navigational display on the screen, and a user input indicative of a desired location is inputted through the controls, the user input is communicated to the client module 22. The API and scripting engine 54 sends control messages and data requests indicative of the user input to the vehicle module 24 through the data links 28. In this above mentioned example, the vehicle module 24 is a telematics control module. The vehicle module 24 processes the control messages and data requests generated by the user input, and generates the graphical content data based on the user input. The vehicle module then communicates the graphical content data to the client module 22 by data signals that are in the scripting language format, the markup language format, and the style sheet language format through the data links 28.

The client module 22 can also display information from an electronic device or a remote data source that is in communication with the client module 22 as well. In the embodiment as shown, the control module 22 is in communication with the off-board server 30 by the data link 32. In one embodiment, the off-board server 30 provides an Internet connection. The off-board server 30 generates graphical content, such as an Internet webpage, that is intended for display on the display module 20, and transmits the graphical content over the data links 32 and to the client module 22 in the form of the scripting language format, the markup language format, and the style sheet language format. The client module 22 receives the graphical content data including data signals that are in the scripting language format, the markup language format, and a style sheet language format from the off-board server 30. The rendering engine 52 is used to receive and display the data signals in the markup language and the style sheet language format on the display monitor 20. The API and scripting engine 54 is used to interact with the data signal indicative of the scripting language from the off-board server 30, and also executes the scripting language accordingly.

The client module 22 can also display information from the electronic device 34 that is in communication with the client module 22. The electronic device 34 is any type of electronic device that is capable of generating and sending graphical content through the data link 36. For example, the electronic device 34 can be a smartphone, a PDA, or a laptop computer. The electronic device 34 generates graphical content and transmits the graphical content over the data link 36 and to the client module 22 in the form of the scripting language format, the markup language format, and the style sheet language format. The rendering engine 52 is used to receive the data signals in the markup language and the style sheet language format from the electronic device 34, and displays the data signals on the display monitor 20. The API and scripting engine 54 is used to interact with the data signal indicative of the scripting language from the electronic device 34, and executes the scripting language accordingly.

Any internal application processing and application logic that is specific to either the vehicle module 24 or the electronic device 34 is not affected by the ability of the client module 22 to display graphical data generated by the vehicle module 24 or electronic device 34. The rendering engine 52 of the client module 22 allows the graphical data generated by the vehicle module 24, the off-board server 30 and the electronic device 34 to be displayed on the display module 20 using any type of desired structure and presentation. Some other types of communication data systems that are currently available have predefined graphical templates that are usually stored within the memory of a client module. The predefined graphical templates have a preselected text layout, character font, size, and color. When another control module or electronic device sends graphical data to the client module, the graphical data can only be displayed using one of the predefined templates. In contrast, the communication data system 10 is able to display the graphical data without the need for a predefined template. Instead, the display monitor 20 displays the graphical data using the text layout, character font, size, and color that is generated by either vehicle module 24, the off-board server 30 or the electronic device 34. For example, if the electronic device 34 is a device having an Internet browser, the display module 20 will display the text layout, character font, size and color generated by a specific Internet webpage.

Turning now to FIG. 2, and with continued reference to FIG. 1, a method for communicating data through the client module 22 to the display monitor 20 is generally indicated by reference number 100. The method 100 begins at step 102, where the communication data system 10 is provided with the display monitor 20, the client module 22, the vehicle module 24, and the vehicle network 26. The client module 22 can also be in communication with a remote device such as the off-board server 30, the electronic device 34, or both. The client module 22 is in communication with the display monitor 20, the vehicle module 24 and the vehicle network 26 by the data links 28. The client module 22 is in communication with the off-board server 30 by the data link 32 and the electronic device 34 by the data link 36. The method 100 then proceeds to step 104.

In step 104, the client module 22 includes control logic for monitoring the vehicle module 24, the vehicle network 26, the off-board server 30 and the electronic device 34 for graphical content data. The graphical content data includes several types of data signals that are in the scripting language format, the markup language format, and the style sheet language format. If client module 22 does not receive graphical content data, then the client module continues to monitor the vehicle module 24, the vehicle network 26, the off-board server 30 and the electronic device 34. However, if the client module 22 receives a data signal from at least one of the vehicle module 24, the vehicle network 26, the off-board server 30 and the electronic device 34, then method 100 may proceed to step 106.

In step 106, the rendering engine 52 of the client module 22 receives and displays the data signals in the markup language and the style sheet language format on the display monitor 20. The markup language can be any type of markup language that is used to structure and index the text that is to be displayed on the display monitor 20. In one example, may be preferable to use HTML in some types of applications in an effort to reduce development time. The markup generator 44 is used to generate the markup language that is needed to structure and index the text that is to be displayed on the display monitor 20. The style sheet format data is any type of style sheet language that is used to describe the presentation of the text that is to be displayed on the display monitor 20. The data signals are shown on the display monitor 20 as a graphical user interface (GUI). Method 100 may then proceed to step 108.

In step 108, the API and scripting engine 54 interacts with the data signal indicative of the scripting language, and executes the scripting language accordingly. The scripting language format data can be any type of scripting language. However, it may be preferable to use Javascript in some types of applications in an effort to reduce development time. Method 100 may then proceed to step 110.

In step 110, the client module 22 includes control logic for monitoring the display module 20 for data signals indicative of user input. The display module 20 includes selectable controls (not shown) that a user can manipulate to generate a user input. The user input is communicated to the client module 22 through the data link 28. If the client module 22 does not detect a data signal indicative of user input, then the client module 22 continues to monitor the display module 20. If a data signal indicative of user input is detected by the client module 22, then method 100 may proceed to step 112.

In step 112, the data indicative of the user input is sent to the client module 22. The API and scripting engine 54 of the client module 22 interacts with the user input from the display monitor 20, where the data indicative of the user input is in the form of control messages and data requests. Method 100 may then proceed to step 114.

In step 114, control messages and data requests indicative of the user input are sent to at least one of the vehicle module 24, the vehicle network 26, the off-board server 30, or the electronic device 34. Method 100 may then either return to step 104, where the client module 22 monitors the vehicle module 24, the vehicle network 26, the off-board server 30 and the electronic device 34 for graphical content data. Alternatively, method 100 may then terminate.

The description of the invention is merely exemplary in nature and variations that do not depart from the gist of the invention are intended to be within the scope of the invention. Such variations are not to be regarded as a departure from the spirit and scope of the invention.

What is claimed is:

1. A communication data system for a vehicle, comprising:
   a vehicle display connected to the vehicle;
   a plurality of control modules, wherein each of the plurality of control modules include software for generating a graphical text data intended to be shown on the vehicle display, wherein the graphical text data is formatted with a predetermined layout determined by a corresponding one of the plurality of control modules, and wherein the graphical text data includes a set of data signals that define at least one of a text layout, character font, size and color shown on the vehicle display; and
   a client module connected to the vehicle, wherein the client module is in communication with the vehicle display and the plurality of control modules, wherein the client module includes:
      a first control logic for monitoring the plurality of control modules for the set of data signals;
      a second control logic for receiving the set of data signals; and
      a third control logic for showing the graphical text data generated by the at least one of the plurality of control modules on the vehicle display, wherein the graphical text data shown on the vehicle display is formatted with the predetermined layout determined by the corresponding one of the plurality of control modules.

2. The communication data system of claim 1 wherein the set of data signals are in scripting language format, markup language format, and style sheet language format.

3. The communication data system of claim 2 wherein the client module includes a rendering engine and a combined layered application programming interface and scripting engine (API and scripting engine), and wherein the rendering engine receives the data signals in markup language format and style sheet language format, and wherein the API and scripting engine interacts with the data signals in scripting language format.

4. The communication data system of claim 2 wherein the data signals markup language format are in hypertext markup language (HTML), and the data signals in the style sheet language format are in cascading style sheet (CSS) format.

5. The communication data system of claim 2 wherein the client module executes markup language and scripting language based code.

6. The communication data system of claim 2 wherein the client module includes a memory, and wherein the memory stores localized markup language files.

7. The communication data system of claim 1 wherein the vehicle display includes selectable controls that receive user input, wherein the vehicle display generates user input data signals that are indicative of user input, and wherein the user input data signals are communicated to the client module.

8. The communication data system of claim 7 wherein the client module includes a fourth control logic for monitoring the vehicle display for the user input data signals.

9. The communication data system of claim 8 wherein the client module includes a fifth control logic for interacting with the user input data signals, and wherein the client module communicates control messages and data requests indicative of the user input data signals to at least one of the plurality of control modules.

10. The communication data system of claim 1 wherein one of the plurality of control modules is a vehicle control module, and wherein another one of the plurality of control modules is a remote electronic device.

11. The communication data system of claim 10 wherein the vehicle control module is one of a telematics module, an engine control module, and a transmission control module, and wherein the remote electronic device is one of a smartphone, a laptop computer, and a personal digital assistant (PDA).

12. The communication data system of claim 1 wherein the client module and at least one of the plurality of control modules are in communication with a vehicle network, and wherein the vehicle network sends data signals indicating diagnostic information generated by a vehicle system.

13. The communication data system of claim 12 wherein a Media Oriented Systems Transport (MOST) network connection is used between the client module and at least one of the plurality of control modules and the vehicle network.

14. The communication data system of claim 1 wherein the client module is in communication with an off-board server, and wherein the off-board server provides an Internet connection, and wherein the off-board server generates a second set of graphical text data.

15. A method of displaying graphical content on a vehicle display, wherein a client module is provided in a vehicle, and wherein the client module is in communication with the vehicle display and a plurality of control modules, the method comprising:

monitoring the plurality of control modules for a set of data signals, wherein each of the plurality of control modules include software for generating a graphical text data intended to be shown on the vehicle display, wherein the graphical text data is formatted with a predetermined layout determined by a corresponding one of the plurality of control modules, and wherein the graphical text data includes the set of data signals that are in scripting language format, markup language format, and style sheet language format;

converting the set of data signals in markup language format and style sheet language format into data that is shown on the vehicle display;

executing the data signals in scripting language format, wherein the client module interfaces with the data signals in scripting language format received from the plurality of control modules; and showing the graphical text data generated by the at least one of the plurality of control modules on the vehicle display, wherein the graphical text data shown on the vehicle display is formatted with the predetermined layout determined by the corresponding one of the plurality of control modules.

16. The method of claim 15 further comprising storing localized markup language files in a memory of the client module.

17. The method of claim 15 further comprising generating user input data signals that are indicative of user input, wherein the vehicle display includes selectable controls receive user input, and wherein the user input data signals are communicated to the client module.

18. The method of claim 17 further comprising monitoring the vehicle display for the user input data signals.

19. The method of claim 18 further comprising interacting with the user input data signals, wherein the client module communicates control messages and data requests indicative of the user input to at least one of the plurality of control modules.

20. A communication data system for a vehicle, comprising:

a vehicle display connected to the vehicle;

a plurality of control modules, wherein each of the plurality of control modules include software for generating graphical text data intended to be shown on the vehicle display, wherein the graphical text data is formatted with a predetermined layout determined by a corresponding one of the plurality of control modules, and wherein the graphical text data includes a set of data signals in scripting language format, markup language format, and style sheet language format; and a client module connected to the vehicle, wherein the client module is in communication with the vehicle display and the plurality of control modules, wherein the client module includes:

a first control logic for monitoring the plurality of control modules for the set of data signals;

a second control logic for converting the set of data signals in markup language format and style sheet language format into data that is shown on the vehicle display;

a third control logic for executing the data signals in scripting language format, wherein the client module interfaces with the data signals in scripting language format received from the plurality of control modules; and a fourth control logic for showing the graphical text data generated by the at least one of the plurality of control modules on the vehicle display, wherein the graphical text data shown on the vehicle display is formatted with the predetermined layout determined by the corresponding one of the plurality of control modules.

* * * * *